Aug. 28, 1934.  W. J. PEARMAIN  1,971,380
CLUTCH
Filed July 12, 1933
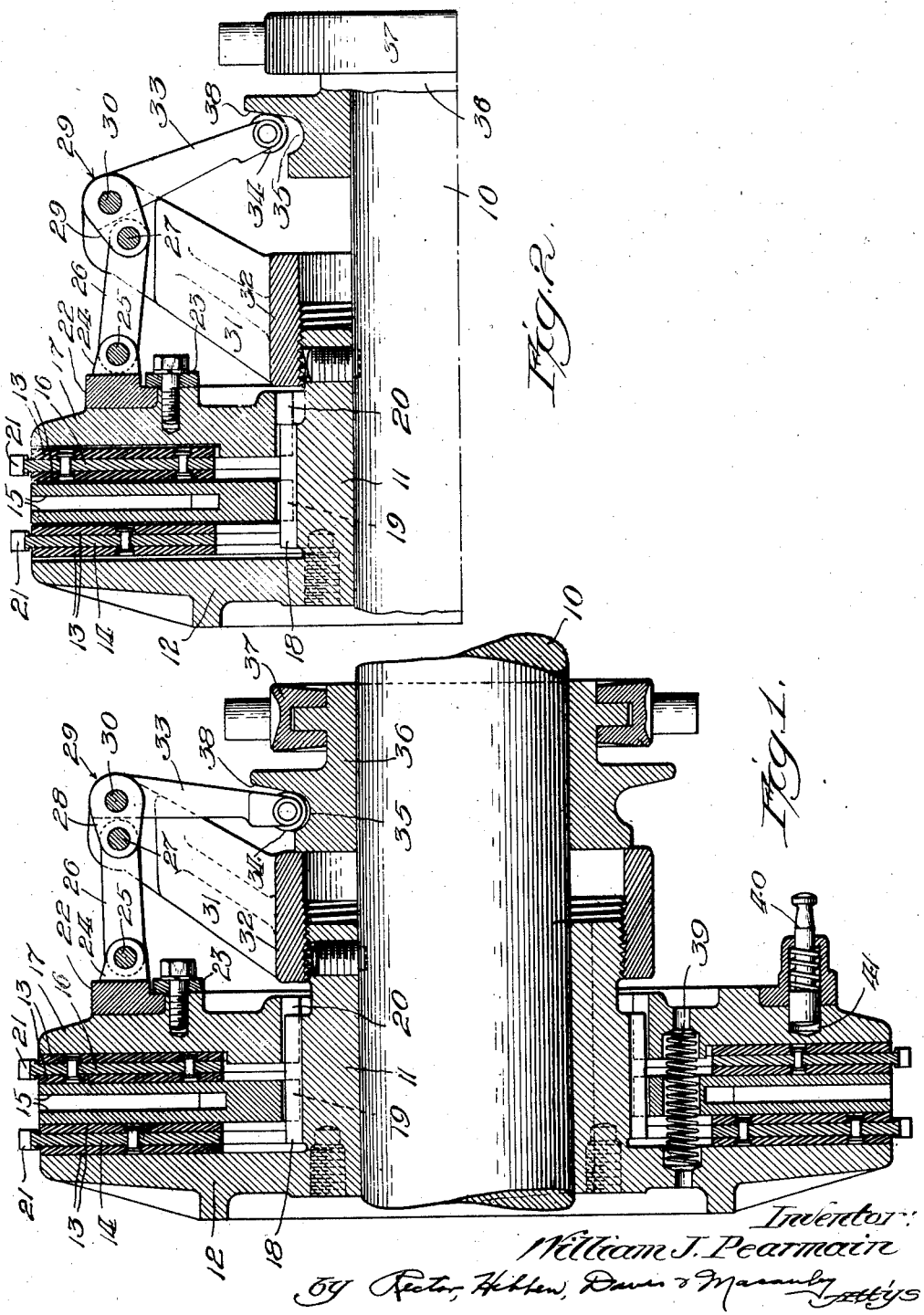
Inventor:
William J. Pearmain
By Rector, Hibben, Davis & Macauley
Attys Patented Aug. 28, 1934

1,971,380

UNITED STATES PATENT OFFICE 1,971,380

CLUTCH

William J. Pearmain, Racine, Wis., assignor to Twin Disc Clutch Company, Racine, Wis., a corporation of Wisconsin Application July 12, 1933, Serial No. 680,000

5 Claims. (Cl. 192—69)

My invention relates to clutches and more particularly to that type in which an intermediate friction plate, usually attached to a driven part such as a flywheel, is gripped on opposite sides by a pair of clamping plates that are connected to a driving part such as a power shaft.

The present invention constitutes an improvement on the clutch disclosed in my United States Letters Patent No. 1,869,982, dated August 2, 1932, although retaining certain major features thereof.

In the clutch shown in the patent, the toggle linkage was mounted upon a split ring that encircles the adjusting collar, and one end of the toggle linkage was connected directly to the floating clamping plate. Further, the index locking pin was mounted directly in the adjusting collar for insertion in a selected aperture in the floating plate. The disposition of the toggle linkage was such that, when the clutch was in driving position, the expanding action of the clutch springs in conjunction with centrifugal force acting on the linkage, tended to retain the clutch in the indicated position, while, when the clutch was in a released position, centrifugal force likewise tended to maintain the clutch in this position. The clutch was therefore particularly useful under operating conditions where the clutch members were mounted upon a driving part, such as a power shaft and wherein it had been hitherto necessary to employ specific devices in order to maintain the toggle linkage in a released position. As a further feature of the clutch shown in the patent, the clamping pressure was applied by the toggle links at substantially the mean radius of the friction discs, this particular application of clamping pressure being particularly desirable in clutch construction.

It is one of the particular objects of the present invention to eliminate the two-piece support for the toggle linkage, namely, the split ring and the adjusting collar, and to substitute therefor a construction wherein the toggle linkage is directly mounted upon a plurality of outwardly extending arms that are integrally formed with the adjusting collar.

A further object is to associate with the floating clamping plate a shiftable ring through which the linkage applies pressure to the floating plate and which is held in any adjusted position by means of the index locking pin which is carried thereby.

These and further objects of my invention will be set forth in the following specification, reference being had to the accompanying drawing, and the novel means by which said objects are effectuated will be definitely pointed out in the claims.

In the drawing:

Figure 1 is a sectional elevation of my improved clutch showing the same in driving position; and Fig. 2 is a sectional elevation of a portion of the clutch, corresponding to that shown in Fig. 1, showing the clutch parts in a released position.

Referring to the drawing, the numeral 10 designates a power shaft which, in the present instance, will be considered as the driving part of the clutch, and which is keyed or otherwise secured to a hub 11 having a disc located at one end thereof which constitutes one clamping plate 12 of the clutch. The working face of the plate 12 engages a ring of friction material 13 which is fixed to one side of a friction plate 14 that is normally engaged by a flywheel or other rotating member (not shown) which forms the driven part of the clutch. The opposite side of the plate 14 is likewise provided with friction material 13 which is intended to engage with one side of a floating clamping plate 15 whose opposite side cooperates with friction material 13 secured to one side of a second friction plate 16 that may be likewise engaged by the aforesaid flywheel. The opposite side of the plate 15 is also provided with friction material that is engaged by a floating clamping plate 17.

The clamping plates 15 and 17 are floatingly mounted upon the hub 11, but rotarily connected thereto, by means of intermeshing teeth 18 on the hub and 19 and 20 on the plates 15 and 17, respectively. Similarly, the peripheries of the friction plates 14 and 16 may be provided with teeth 21 for driving and floating engagement with the flywheel, for example.

A ring 22 is loosely carried by the outer face of the ring 17 and is maintained in this position by means of a ring 23. Extending outwardly from the outer face of the ring 22 is a plurality of pairs of ears 24 and between each pair is bridged a pivot pin 25 which supports one end of a toggle link 26, the outer end of the link being connected by a pivot pin 27 to one arm 28 of a bell crank lever 29 that is pivotally mounted on a pin 30 carried by a pair of arms 31 which extend outwardly from an adjusting collar 32 that is threaded upon the hub 11. It will be understood that there may be as many sets of these toggle linkages employed as desired and that, preferably, they are equally spaced around the axis of the clutch. The other arm 33 of the bell crank lever extends inwardly toward the axis of the clutch and carries on its inner extremity a roller 34 which is intended to engage with an annular groove 35 provided on a sleeve 36 that is shiftable along the shaft 10 by means of a suitable collar 37 in accordance with standard practice.

In order to provide for possible duplex construction, that is, when a pair of clutches are mounted on the same shaft for operation by a single sleeve 36, one side of the groove 35 is continued upwardly to form an annular wall 38, while the opposite side of the groove is cut off as indicated in Fig. 1, in order to permit a complete swing of the roller 34 from the groove.

In Fig. 1, the clutch is shown in driving position and the toggle linkage has been moved to a position by the sleeve 36 such that the center of the pivot pin 27 is slightly above a line connecting the centers of the pivot pins 25 and 30. The clutch is accordingly locked in position due to the extending action of the clutch springs 39 whose ends are received within appropriate recesses provided in the clamping plates 12 and 17. This locking of the clutch is further aided by reason of the fact that the center of mass of the roller 34 is located to the left of a vertical plane including the centers of the pivot pins 30, so that the tendency of centrifugal force is to rock the bell crank levers in a clockwise direction, that is, one in which the levers tend to maintain the locking of the clutch. This tendency of the bell crank levers to move in a clockwise direction is limited by the engagement of the left face of the sleeve 36 with the right face of the adjusting collar 32, as clearly shown in Fig. 1. Moreover, it will be seen from an examination of the same figure that the application of clamping pressure to the floating plate 17 is substantially around the circumference of a circle that is determined by the mean radius of the friction discs.

When it is necessary to release the clutch, this action is effected merely by shifting the sleeve 36 toward the right, as illustrated in Fig. 2, which serves to break the toggle linkage and so permit the clutch springs 39 to separate the clamping plates from the friction plates. In this position of the parts, it will be particularly noted that the roller 34 has been moved to the right of a vertical plane including the centers of the pivot pins 30, so that centrifugal force is then acting in a direction to maintain the clutch parts in released position. This construction is particularly useful under conditions where the clutch parts are mounted upon a power shaft that rotates at high speed while the clutch is in released position.

As the friction discs wear, a resetting of the fulcrum pivot pins 30 may be simply effected by threading the adjusting collar 32 toward the left, as viewed in Fig. 1, and, when the adjusted position is reached, locking the adjustment by means of an index locking pin 40 that is carried by the ring 22 and is inserted in a selected aperture 41 provided in the face of the clamping plate 17.

The foregoing construction not only results in a simplification over the arrangement shown in the indicated patent, but it places the locking pin in a position for more convenient access. Moreover, it will be understood that my improved construction is also completely operative under conditions where the friction plate is connected to the driving part of the clutch and the remaining parts to the driven part.

I claim:

1. In a clutch, the combination of a friction plate, clamping plates engaging the opposite sides of the friction plate, one of the clamping plates being adapted for mounting on a shaft and the other clamping plate floating axially relative to the shaft-mounted clamping plate and having a toothed connection therewith, a collar axially adjustable on the shaft-mounted clamping plate and having integral arms extending outwardly therefrom, bell crank levers pivoted on the arms, one arm of each lever extending towards the floating clamping plate and the other towards the axis of the clutch, links connecting the first named arms to the floating clamping plate at substantially the mean radius of the friction plate, and a sleeve slidable on the shaft for operatively engaging the other lever arms.

2. In a clutch, the combination of a friction plate, clamping plates engaging with the opposite sides of the friction plate, one of the clamping plates being adapted for mounting on a shaft and the other clamping plate floating axially relative to the shaft-mounted clamping plate but rotating therewith, a ring shiftably mounted on the floating clamping plate, a collar axially adjustable on the shaft-mounted clamping plate, bell crank levers pivoted on the collar, one arm of each lever extending toward the floating clamping plate and the other toward the axis of the clutch, links connecting the first named arms to the ring, locking means for maintaining the ring in any fixed adjusted position relative to the floating plate, and a sleeve slidable on the shaft for operatively engaging the other lever arms.

3. In a clutch, the combination of a friction plate, clamping plates engaging the opposite sides of the friction plate, one of the clamping plates being adapted for mounting on a shaft and the other clamping plate floating axially relative to the shaft-mounted clamping plate but rotating therewith, a ring shiftably mounted on the floating clamping plate, a collar axially adjustable on the shaft-mounted clamping plate, bell crank levers pivoted on the collar, one arm of each lever extending toward the floating clamping plate and the other toward the axis of the clutch, links connecting the first named arms to the ring, an index locking pin carried by the ring and insertable in a selected aperture in the floating clamping plate for maintaining the ring in a fixed adjusted position relative to the floating clamping plate, and a sleeve slidable on the shaft for operatively engaging the other lever arms.

4. In a clutch, the combination of a friction plate, clamping plates engaging the opposite sides of the friction plate, one of the clamping plates being adapted for mounting on a shaft, and the other clamping plate floating axially relative to the shaft-mounted clamping plate but rotating therewith, a ring shiftably mounted on the floating clamping plate, a collar axially adjustable on the shaft-mounted clamping plate, and having integral arms extending outwardly therefrom, bell crank levers pivoted on the arms, one arm of each lever extending toward the floating clamping plate and the other toward the axis of the clutch, links connecting the first named arms to the ring, locking means for maintaining the ring in a selected fixed adjusted position relative to the floating clamping plate, and a sleeve slidable on the shaft for operatively engaging the other lever arms.

5. In a clutch, the combination of a friction plate, clamping plates engaging the opposite sides of the friction plate, one of the clamping plates being adapted for mounting on a shaft and the other clamping plate floating axially relative to the shaft-mounted clamping plate but rotating therewith, a ring shiftably mounted on the floating clamping plate, a collar axially adjustable on the shaft-mounted clamping plate and having integral arms extending outwardly therefrom, bell crank levers pivoted on the arms, one arm of each lever extending toward the floating clamping plate and the other toward the axis of the clutch, links connecting the first named arms to the ring, an index locking pin carried by the ring and insertable in a selected aperture in the floating clamping plate for determining the adjusted location of the ring relative to the floating clamping plate, and a sleeve slidable on the shaft for operatively engaging the other lever arms.

WILLIAM J. PEARMAIN.